United States Patent Office 2,835,719
Patented May 20, 1958

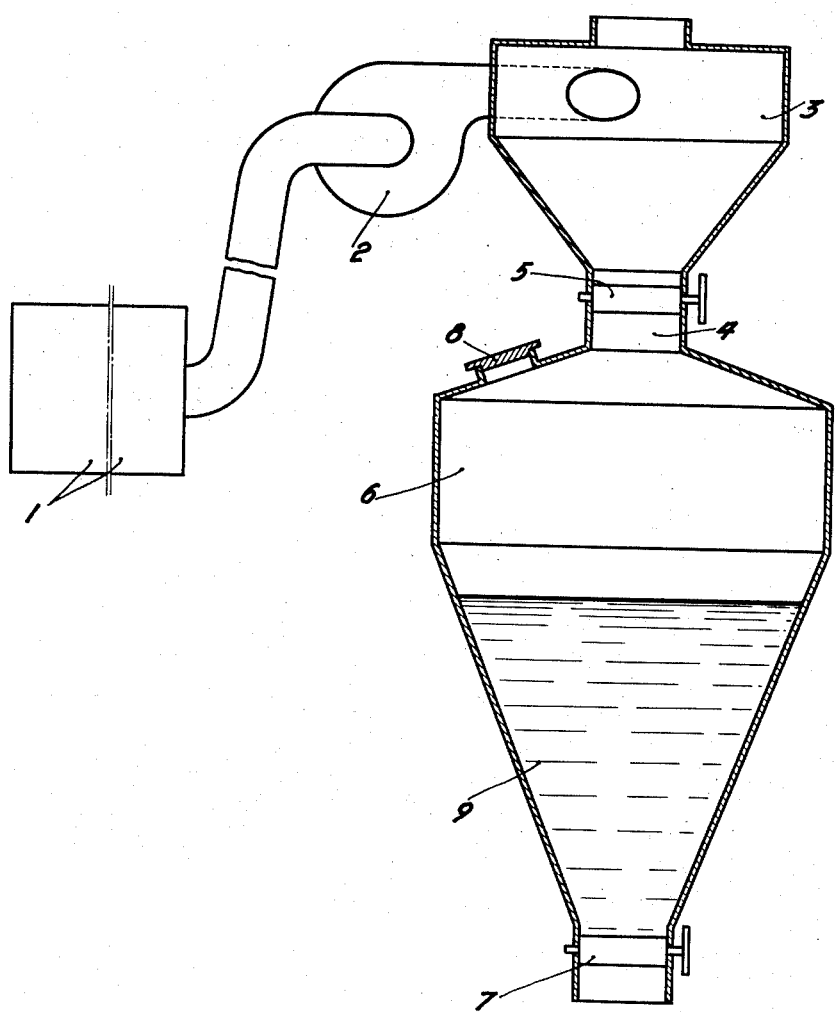

2,835,719

MANUFACTURE OF STORAGE BATTERY PLATES

Guy Bazalgette, Paris, France

Application January 19, 1955, Serial No. 482,821

Claims priority, application France January 23, 1954

3 Claims. (Cl. 136—27)

The present invention relates to the manufacture of plates for making lead batteries.

Such plates are generally made of grids consisting of a lead-antimony alloy on which a paste is applied which is obtained by action of sulfuric acid on one or more lead oxides.

Said lead oxides may be obtained by means of various methods amongst which one should be more particularly cited, which consists in eroding lead balls to a powder in a rotating cylinder mill. The powder which is thus obtained is carried away by a draught of air and is transformed into an oxide which is gathered inside a silo from which it is extracted to be placed in barrels, before being submitted to a further treatment by means of diluted sulfuric acid in order to produce the paste which is to be applied on the grids.

Such a method, similarly to all the other methods which are used for obtaining lead oxides, is inconvenient in that it provides a powder which contains lead which is oxidized at various degrees, the proportion of the various oxides which are present in said powder being difficult to establish and practically impossible to control in order that it should be constant from one manufacturing operation to another. Furthermore, these proportions undergo a modification during the storage period of the powder which is more or less oxidized according to the hygrometric state of the atmosphere, of the surrounding temperature and of the very volume of the stored powder. The powder grains also have a tendency to agglomerate during this storage period and a granulometric control is impossible. For all these reasons, it is a very difficult problem to obtain a powder presenting constant qualities and the manufacture of lead plates for storage batteries is therefore greatly complicated.

The present invention has for its object to provide a method which does away with all these drawbacks and which provides pastes for the manufacture of battery plates of a constant composition, easily reproducible and which are of a superior quality as compared to plates which have been obtained to this date.

The present invention fundamentally consists in manufacturing a powder containing a major proportion of lead suboxide $Pb_2O$ by reciprocally eroding scraps, such as balls of metallic lead, in carrying away the lead powder thus obtained by means of a draught of air, in separating said powder from said draught and immediately gathering said powder under water, thus forming an aqueous paste of lead suboxide. Said paste, after having possibly been separated from the supernatant excess of water, is mixed with sulfuric acid to provide a paste of lead sulphate which is used to impaste, in any known manner, grids made of a lead alloy.

Due to the fact that the powder is immersed in water immediately after it has been manufactured, its grains are covered with a thin superficial layer of lead hydroxide and are stabilised in the state in which they have been obtained, thus avoiding any further evolution which would cause oxides to be formed at various degrees of oxidation in undetermined proportions. It is therefore easy to obtain a powder with a practically constant composition and which contains substantially only lead suboxide with, if desired, a small proportion of non-oxidized lead, by acting upon the manufacturing conditions of the power, viz: the speed of erosion of the metallic lead and the outlet of the draught of air which carries away the powder, these conditions being easily experimentally regulated in order to obtain the desired result.

The paste of lead suboxide which is obtained may be mixed with sulfuric acid either immediately after it has been manufactured, or after it has been stored, the duration of this storage causing no modification to the final result, since the chemical composition and the physical state of the paste do not practically alter.

The transformation of the oxide paste into a sulphate paste is preferably obtained by addition of concentrated sulfuric acid in the proportion of substantially 3 g. of pure $SO_4H_2$ for 100 g. of decanted paste. A paste of hydrated basic lead sulphate is thus obtained which is partially transformed into litharge. It has been surprisingly observed that the product which is obtained crystallizes much better than the product which is made of pastes manufactured by adding diluted sulphuric acid to dry lead oxides and that the lead contained in the paste is entirely transformed, the paste of sulphate and litharge practically containing no more metallic lead, contrarily to what happened in the pastes obtained heretofore. The result is, on the one hand, a better cohesion of the plates which are obtained from such pastes and, on the other, an increased coefficient of use of the active material entering the composition of said plates.

Finally, the grain size of the powder constituting the paste obtained according to the invention is smaller than the fineness of grains of pastes obtained in treating dry oxide with diluted sulphuric acid, the product which is finally obtained after the grids have been impasted therefore having a lower apparent density, which results, for an equal volume of paste, in saving material by weight.

It also has been observed that after the plates according to the invention have been charged electrically, the positive plates are richer in lead peroxide $PbO_2$ and therefore have a greater capacity. This greater content in $PbO_2$ has been qualitatively observed by means of X-ray spectrography and quantitatively by thermogravimetry and by chemical measures; the results have proved that the plates which were obtained according to the invention contained between 12 and 14% more $PbO_2$ than plates obtained by usual methods.

The method according to the present invention therefore provides storage battery plates which, besides the fact that they possess a cohesion which is stronger than in known plates, have a greater capacity as compared with an equal weight or are lighter as compared with an equal capacity.

Finally, it should be remarked that the fact of immersing the lead oxide powder in water immediately after it has been manufactured, totally avoids the production of impurities and practically avoids all the risks of intoxication of the staff who controls the operations.

An embodiment of the method according to the invention is described hereafter, by way of example, with reference to the appended drawing diagrammatically illustrating a plant for the manufacture of lead suboxide paste.

Such a plant comprises a mill 1 with a rotative drum of a type known per se, into which balls of lead are introduced which are eroded to yield a lead suboxide powder. A fan 2 is provided for aspirating the powder produced by the mill and for delivering it to a separator 3. Said separator is connected by means of a duct 4 provided with a gate 5, with a collecting vessel 6 closed at its lower part by an air-tight gate 7 and which is provided with an inlet orifice 8 through which it is possible to introduce water into collector 6.

After the mill 1 and the fan 2 have been started, the lead suboxide powder passes into separator 3 where it is separated from the air which has carried it away. The fineness of the powder may be controlled as well by the rotation speed of the mill drum as by the speed of the fan, said fineness being all the greater as said drum rotates faster and said fan rotates at a lower speed. Gate 5 is opened, periodically or not, and the said powder is caused to fall into the water contained in vessel 6. The powder absorbs water and a paste is formed which deposits at the bottom of the collector and said paste may be collected through gate 7 in order to store it into barrels, together with a certain amount of water, or to be directly submitted to the further treatment as hereafter described.

The paste which is thus obtained is thereafter treated with sulfuric acid, either directly, or after it has been stored. This treatment is conducted in mixing the $Pb_2O$ paste after the excess of water has eventually been removed from the surface of the powder, directly inside a mixing tank with concentrated sulphuric acid in the proportion of 3 g. of acid for 100 g. of paste. As soon as it is in the presence of acid and air, the lead oxide $Pb_2O$ is transformed into hydrated basic lead sulphate and into litharge. The paste which is finally obtained is then used for impasting storage battery grids in the usual manner, with the sole difference that it is not necesssary to dry the plates after they have been impasted.

As an example, 1000 kg. of lead balls have been introduced into mill 1 and transformed into 1040 kg. of powder formed of about 85% of $Pb_2O$ and about 15% of metallic lead, the latter being present in certain grains of the powder in the form of cores wrapped up in lead suboxide. The grain size of said powder was between 0.5 and 5 microns. The powder was immediately gathered in the vessel 6 containing 500 liters of water and it decanted at the bottom of the collector, absorbing 290 liters of water.

The aqueous lead paste after having been thus decanted was extracted from the collector 6 through gate 7 and introduced into a mixing tank inside which it was mixed during 20 to 30 minutes with 40 kg. of concontrated sulphuric acid. A paste of hydrated basic lead sulphate and litharge was thus obtained containing no metallic lead, which was used in a known manner for impasting storage battery grids made of an alloy of lead and antimony.

What I claim is:

1. A method for the manufacture of storage battery lead plates obtained by impasting lead alloy grids comprising the steps of providing a draft of air and entraining therein lead particles which are eroded from scraps of lead in the presence of that draught of air, thus producing an entrained powder containing a major proportion of lead suboxide, separating said powder from said draught of air which carries it away and directly and immediately without further oxidation immersing it under water, whereby a stabilized aqueous paste of lead suboxide is obtained, decanting said paste while eliminating the excess of remaining water, mixing said paste with sulfuric acid and impasting said grids with said paste.

2. A method as claimed in claim 1 in which the aqueous lead suboxide paste is mixed with concentrated sulphuric acid.

3. A method for the manufacture of storage battery lead plates obtained by impasting lead alloy grids, comprising the steps of providing and entraining, in a draft of air, lead particles which are eroded from scraps of lead in the presence of that draught of air, thus producing an entrained powder containing a major proportion of lead suboxide, separating said powder from said draught of air which carries it away and directly and immediately without further oxidation immersing it under water, whereby an aqueous paste of lead suboxide is obtained, decanting said paste while leaving only a slight quantity of water in excess, storing said paste under said excess of water, taking up said paste after storage, eliminating the said excess of water and mixing said paste with sulphuric acid and impasting said grids with said paste.

References Cited in the file of this patent

UNITED STATES PATENTS

| Number | Name | Date |
|---|---|---|
| 538,628 | Silvey | Apr. 30, 1895 |
| 1,587,623 | Zuckerman | June 8, 1926 |
| 1,610,345 | Williams | Dec. 14, 1926 |
| 1,619,295 | Gardner | Mar. 1, 1927 |
| 1,709,848 | Hardinge | Apr. 23, 1929 |